(12) United States Patent
Chachick et al.

(10) Patent No.: US 11,775,301 B2
(45) Date of Patent: Oct. 3, 2023

(54) COPROCESSOR REGISTER RENAMING USING REGISTERS ASSOCIATED WITH AN INACTIVE CONTEXT TO STORE RESULTS FROM AN ACTIVE CONTEXT

(71) Applicant: Apple Inc., Cupertino, CA (US)

(72) Inventors: Ran Aharon Chachick, Providence, RI (US); Aditya Kesiraju, Campbell, CA (US); Andrew J. Beaumont-Smith, Cambridge, MA (US); Jong-Suk Lee, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/644,016

(22) Filed: Dec. 13, 2021

(65) Prior Publication Data

US 2023/0095072 A1 Mar. 30, 2023

Related U.S. Application Data

(60) Provisional application No. 63/248,239, filed on Sep. 24, 2021.

(51) Int. Cl.
*G06F 9/30* (2018.01)
*G06F 9/50* (2006.01)
*G06F 15/80* (2006.01)
*G06F 9/38* (2018.01)

(52) U.S. Cl.
CPC ........ *G06F 9/30123* (2013.01); *G06F 9/3009* (2013.01); *G06F 9/384* (2013.01); *G06F 9/3877* (2013.01); *G06F 15/80* (2013.01)

(58) Field of Classification Search
CPC .... G06F 9/3009; G06F 9/30123; G06F 9/384; G06F 9/3877; G06F 9/50; G06F 9/5011; G06F 9/5016; G06F 9/5077; G06F 15/80
See application file for complete search history.

(56) References Cited

U.S. PATENT DOCUMENTS

| 6,061,711 A | 5/2000 | Song et al. |
| 6,092,175 A * | 7/2000 | Levy ..................... G06F 9/3855 |
| | | 712/E9.035 |

(Continued)

*Primary Examiner* — David J. Huisman
(74) *Attorney, Agent, or Firm* — Kowert, Hood, Munyon, Rankin & Goetzel, P.C.; Erik A. Heter; Dean M. Munyon

(57) ABSTRACT

A coprocessor with register renaming is disclosed. An apparatus includes a plurality of processors and a coprocessor respectively configured to execute processor instructions and coprocessor instructions. The coprocessor receives coprocessor instructions from ones of the processors. The coprocessor includes an array of processing elements and a result register set comprising storage elements respectively distributed within the array of processing elements. For a given member of the array of processing elements, a corresponding storage element is configured to store coprocessor instruction results generated by the given member. The result register set implements a plurality of contexts to store respective coprocessor states corresponding to coprocessor instructions received from different processors. Based on a determination that one of the contexts is inactive, the coprocessor is configured to store coprocessor instruction results corresponding to an active context within storage elements of the result register set corresponding to the inactive context.

20 Claims, 8 Drawing Sheets

(56) References Cited

U.S. PATENT DOCUMENTS

| | | | |
|---|---|---|---|
| 2001/0004755 A1* | 6/2001 | Levy | G06F 9/3857 |
| | | | 712/217 |
| 2008/0209168 A1 | 8/2008 | Yokota | |
| 2009/0089817 A1* | 4/2009 | Bybell | G06F 9/30123 |
| | | | 712/E9.016 |
| 2011/0161616 A1* | 6/2011 | Tarjan | G06F 9/384 |
| | | | 711/170 |
| 2015/0378782 A1 | 12/2015 | Hks et al. | |
| 2018/0096446 A1* | 4/2018 | Chen | G06F 9/30076 |
| 2018/0276046 A1* | 9/2018 | Joao | G06F 9/4881 |
| 2019/0294585 A1* | 9/2019 | Serrano | G06F 9/5016 |
| 2020/0004534 A1* | 1/2020 | Gurram | G06F 9/3887 |

\* cited by examiner

COPROCESSOR REGISTER RENAMING USING REGISTERS ASSOCIATED WITH AN INACTIVE CONTEXT TO STORE RESULTS FROM AN ACTIVE CONTEXT

PRIORITY CLAIM

This application claims priority to U.S. Provisional Patent Application 63/248,239, filed Sep. 24, 2021, and which is incorporated by reference in full.

BACKGROUND

Technical Field

This disclosure is directed to processors, and more particularly, to register renaming in processors.

Description of the Related Art

Processors are a critical component of many digital systems, often determining how much performance and/or power efficiency can be achieved in the system. In some cases, a subset of the instruction set implemented by a processor can be implemented in a coprocessor that can be higher performance and/or more efficient at executing the subset of the instructions than the processor. Alternatively, instructions can be added to the instruction set that are specifically designed to be executed by the coprocessor, using specialized hardware that a general purpose processor would not implement.

Processors typically include registers for storing operands used in the execution of certain instructions, as well as a place to store results of instruction execution prior to any writeback to memory. Similarly, coprocessors may also include registers to store instruction operands and instruction results.

SUMMARY

A coprocessor with register renaming is disclosed. In one embodiment, an apparatus includes a plurality of processors and a coprocessor respectively configured to execute processor instructions and coprocessor instructions. The coprocessor is configured to receive the coprocessor instructions from ones of the plurality of processors. The coprocessor includes an operand register set configured to store operands for coprocessor instructions to be executed and an array of processing elements. The coprocessor further includes a result register set comprising storage elements respectively distributed within the array of processing elements, wherein for a given member of the array of processing elements, a corresponding storage element is configured to store coprocessor instruction results generated by the given member. The result register set implements a plurality of contexts configured to store respective coprocessor states corresponding to coprocessor instructions received from different ones of the plurality of processors. Based on a determination that one of the contexts is inactive, the coprocessor is configured to store coprocessor instruction results corresponding to an active context within storage elements of the result register set corresponding to the inactive context.

BRIEF DESCRIPTION OF THE DRAWINGS

The following detailed description makes reference to the accompanying drawings, which are now briefly described.

DETAILED DESCRIPTION OF EMBODIMENTS

Figure 1:
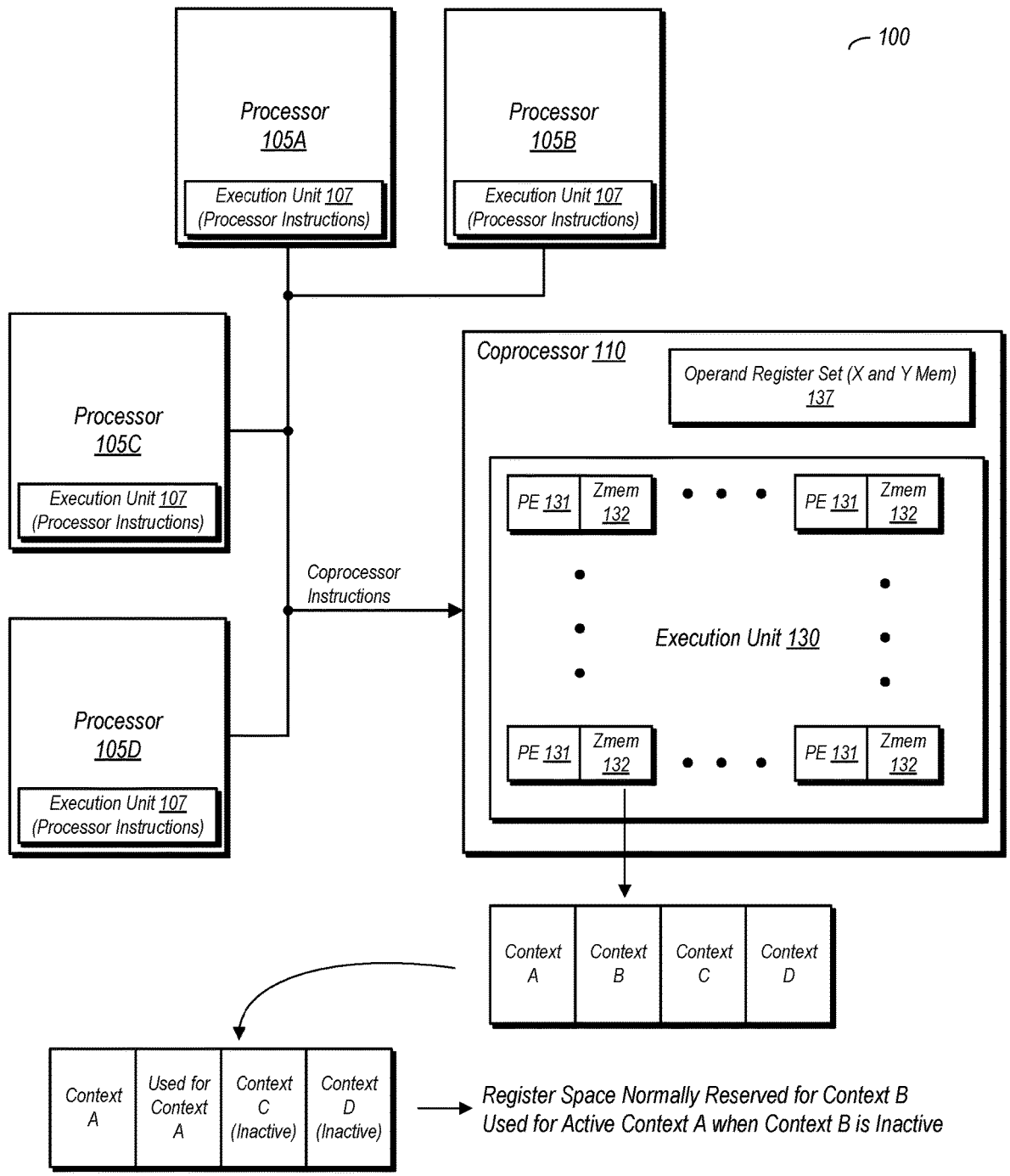
FIG. 1 is a block diagram of one embodiment of an apparatus including a coprocessor and a plurality of processors.

The present disclosure is directed to various embodiments of a coprocessor that utilizes register renaming for result registers. Coprocessors are sometimes used to augment main processors in a computer system. While the main processor may execute a majority of instructions of an instruction set architecture, a coprocessor may be provided to execute particular ones of the instruction set for which it may be optimized. For example, a main processor in a computer system may be a superscalar processor that executes a majority of instructions for an instruction set. However, the instruction set may include vector and/or matrix instructions that may be more efficiently executed by a coprocessor optimized for the same. In such an embodiment, the coprocessor may include a plurality of processing elements that are arranged in a grid or matrix, e.g., in an N×N array of processing elements. With regard to registers for storing the results of executed instructions, the various processing elements of the grid may each include a portion of a result register.

Many computer systems utilize multiple instances of a general purpose processor to provide parallel processing capability. Such systems may also include a coprocessor, a single instance of which may be used to augment the processing capabilities of the multiple general purpose processors. In such embodiments, portions of the result registers may be reserved for each of the general purpose processors served by the coprocessor. The reserved portions of the result registers may thus implement a number of contexts, one for each of the general purpose processors served by the coprocessor. As a result, when a particular coprocessor executes a sequence of instructions for a particular context associated with one of the general purpose processors, the results are typically stored out to memory or a cache before beginning execution of a next instructions for that context. This may limit the performance of the coprocessor due to the latency of store operations. This problem may be exacerbated in certain types of coprocessors. For example, a coprocessor with a large number of processing elements with a set of result registers distributed among the processing elements can be significantly large in size, on the order of several tens of kilobytes. Thus, the store operations from a distributed set of result registers can consume a significant amount of time, and can thus be a barrier to desired performance. Furthermore, the renaming of result registers that are distributed may be difficult due to the size of the result register set, the access pattern, and its distributed nature. With regard to the access pattern, some instructions may access the entirety of the result register set, while other instructions may access only some of the result registers. In the case of the latter, the result registers may not always be adjacent to one another.

The present disclosure makes use of the insight that there are times during operation where some contexts are inactive, including times in which all but one context is inactive. Accordingly, the present disclosure is directed to utilizing the result registers for the inactive contexts through register renaming. Renaming logic in a coprocessor may monitor the various contexts and determine when one or more contexts is inactive. Accordingly, for an active context in such a scenario, the renaming logic may rename result registers to correspond to a currently active context. Register renaming as disclosed herein may be simplified and performed at less performance cost by utilizing the inactive contexts for renaming. When an instruction is executed for the currently active context, the results may be written to one of the result registers. However, instead of waiting until the store operation completes, the next instruction in the sequence for the active context may begin execution, writing results to ones of the result registers that have been renamed from one of the inactive contexts. Performing register renaming of the result registers may thus improve performance as well as providing some level of optimization of the register space within the set of result registers. By overlapping the execution of instructions in an active context in the manner described herein, an execution pipeline in the coprocessor may remain full. Furthermore, since various ones of the general purpose processors may have dependencies on coprocessor instructions, the benefits of performance improvements achieved by register renaming of the result registers may be shared.

The renaming logic may utilize various triggers to determine when a context becomes inactive, such as the execution of certain instructions. Other types of triggers are possible and contemplated.

The present disclosure begins with a description of a system, as illustrated in FIG. 1, including a number of processors and a coprocessor that may implement a plurality of contexts for each of the processors. Embodiments of a coprocessor are then discussed with respect to FIGS. 2 and 3. Certain aspects of the operation with regard to register renaming in a result register set are then described with reference to FIGS. 4 and 5, while an example of a system-on-a-chip (SoC) that includes an embodiment of the coprocessor per this disclosure is discussed in reference to FIG. 6. A flow diagram illustrating a method for register renaming in a coprocessor is described with reference to FIG. 7. The disclosure concludes with a description of an example system with reference to FIG. 8.

Apparatus with Coprocessor Utilizing Result Register Renaming:

Turning now to FIG. 1, a block diagram of one embodiment of a system including a number of processors and a coprocessor is shown. In the embodiment shown, system 100 includes a number of processors 105A-105D configured to execute processor instructions. The number of processors may vary from one embodiment to the next, and thus the specific number shown in FIG. 1 is intended to be one possible example. Each of processors 105A-105D includes a corresponding execution unit 107, which includes circuitry configured to execute processor instructions. System 100 also includes a coprocessor 110, which is configured to execute coprocessor instructions. Ones of the plurality of processors 105A-105D are configured to provide the coprocessor instructions to the coprocessor 110. Generally speaking, coprocessor 110 may operate in a subordinate role to the various ones of processors 105A-105D, and may augment their operation by executing coprocessor instructions for which it is optimized. As will be discussed below, one embodiment of a coprocessor 110 may execute vector and/or matrix instructions. The coprocessor instructions may appear in instructions streams that are fetched by various ones of the processors 105A-105D. These instructions may be subsequently forwarded to coprocessor 110 for execution.

Coprocessor 110 in the embodiment shown includes an operand register set 137 configured to store operands for coprocessor instructions to be executed. Operands for the instructions to be executed by coprocessor 110 may be written into operand register set 137 from, e.g., a cache memory or a main system memory. Coprocessor 110 further includes an execution unit 130 having an array of processing elements (PEs) 131 implemented therein. As shown here, the array of processing elements may be arranged in a grid of rows and columns, and the number of PEs 131 may vary from one embodiment to the next. In one embodiment, execution unit 130 includes N rows and N columns of PEs 131, wherein N is an integer value.

A result register set, in the form of Z memory 132, includes storage elements respectively distributed within the array of PEs 131. As shown here, the various ones of PEs 131 are associated with corresponding ones of Z memory 132. Thus, for a given memory of the array of PEs 131, a corresponding storage element of Z memory 132 is configured to store coprocessor instruction results generated by the given member. The size of the Z memory 132 is dependent both on the number of processing elements as well as the number of processors 105 served, and can thus be significant. The result register set implemented by Z memory 132 in the embodiment shown implements a plurality of contexts configured to store respective coprocessor states corresponding to coprocessor instructions received from different ones of the plurality of processors. Furthermore, coprocessor 110 is configured to, based on a determination that a one of the contexts is inactive, store coprocessor instruction results corresponding to an active context within storage elements of the result register set corresponding to the inactive context. That is, a given portion of Z memory 132 that is reserved for a context, currently inactive, corresponding to one of the processors may be renamed and thus used by another processor having a context that is currently active. Thus, coprocessor 110 implements register renaming for the Z memory 132 and the elements thereof.

As shown in FIG. 1, the elements of Z memory 132 may include storage space for four contexts, Context A, Context B, Context C, and Context D, which correspond to processors 105A-105D, respectively. If at a given time Context A is active, but Context B is inactive, coprocessor 110 may re-allocate the space in Z memory 132 from the inactive Context B to the active Context A, thereby performing register renaming of the result registers of this embodiment. This may allow for improved performance. In particular, upon completing the execution of one instruction that includes writes to a designated portion of Z memory 132, a next instruction in the context may begin executing immediately, concurrent with a store operation to write back (to cache memory or main system memory) the results from the just completed instruction from Z memory 132. In the absence of the renaming as disclosed herein, a next instruction for a particular context could not begin execution until the results from the previous instruction have been written back to a memory location lower in the memory hierarchy. Since the Z memory 132 may be much larger (e.g., on the order of several tens of kilobytes) than a typical register, the store operation can consume a significant amount of time. Using the register renaming techniques disclosed herein, the store operation may be conducted concurrently with the execution of the next instruction for a particular context.

Although not explicitly shown in FIG. 1 (but shown in other figures discussed below), coprocessor 110 may include rename logic to carry out the various renaming operations disclosed herein. The rename logic may monitor active contexts corresponding to the plurality of processors within coprocessor 110. Based on this monitoring, the rename logic may determine which of the plurality of contexts, if any, is inactive and assign the corresponding result register set(s) to the active context.

The rename logic may use various mechanisms to determine when a context is inactive. For example, in one embodiment, the rename logic is configured to identify an inactive context in response to detecting execution of a particular type of instruction that marks a context inactive. Execution of a zeroing instruction may also be performed, which causes all logic zeros to be written to a particular result register of the result register set, and corresponds to the rename logic changing a portion of the result register set used by a subsequent instruction of an already active context into one that is currently unused. In some embodiments, the rename logic is configured to track which portions of a particular register of the result register set were used during execution of a particular instruction and may identify an inactive context in response to detecting that the portions of the particular register of the result register set have been written as all logic zeros. Embodiments are further contemplated in which the rename logic is configured to rename a particular one of the result register set in response to execution of an instruction that writes to the particular one of the result register set but does not read from contents from the particular one of the result register set.

As previously noted, the register renaming performed with regard to Z memory 132 may allow for improved performance when a particular context includes multiple instructions in a sequence due to the fact that no store of the result register contents is required before beginning execution of the next instruction. Without the renaming discussed herein, either the execution of the next instruction for a particular context would have to be delayed, or a write after read hazard would occur in the result register space allocated to that particular context. Accordingly, storing instruction execution results from an active context in result register storage elements corresponding to an inactive context may eliminate a write after read hazard.

Figure 2:
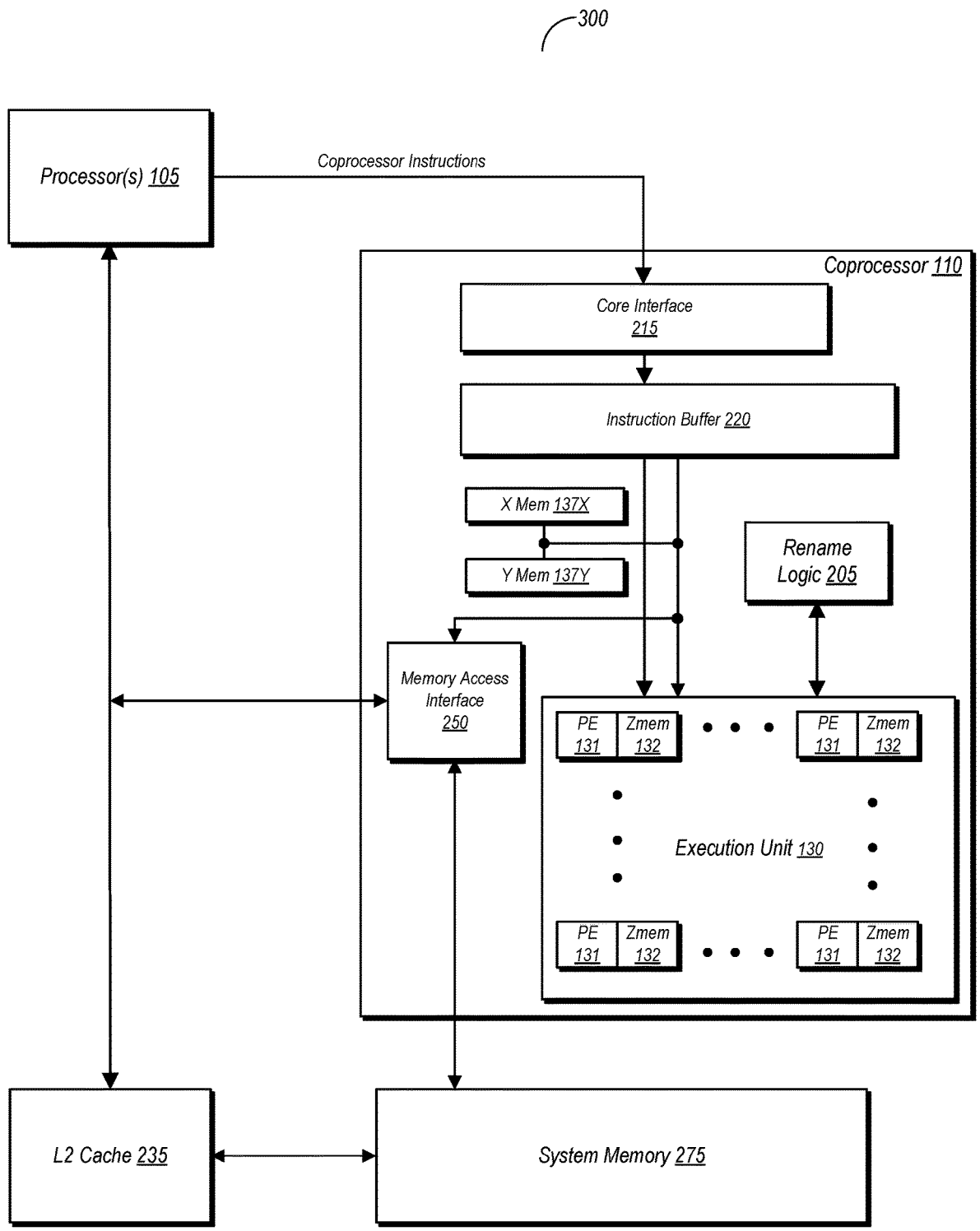
FIG. 2 is a block diagram of one embodiment of a coprocessor.

Coprocessor Embodiments:

FIG. 2 is a block diagram of one embodiment of a system 300 including processor(s) 105 (which may include a number of processors or processor cores, as shown in FIG. 1), a coprocessor 110, and a level two (L2) cache 235. In the illustrated embodiment, the processors 105 are coupled to the L2 cache 235 and the coprocessor 110. Coprocessor 110 is also coupled to the L2 cache 235. The coprocessor 110 may include an instruction buffer 220, an X memory 137X and a Y memory 137Y. An execution circuit 130 includes a number of processing elements (PEs) 131, arranged in an array having a number of rows and a number columns in this embodiment. A Z memory (or result register set) 132 is distributed among the PEs 131, with a portion of Z memory 132 being associated with each of the PEs 131. Register rename logic 205 is coupled to execution unit 130 and thus to the various portions of the distributed Z memory 132. A memory access interface 250 is coupled to execution unit 130, X memory 137X, Y memory 137Y, and instruction buffer 220. In some embodiments, circuits may be coupled if they are electrically coupled (e.g., directly connected or indirectly connected through one or more other circuits) and/or communicatively coupled.

The coprocessor 110 may be configured to perform one or more computation operations and one or more coprocessor load/store operations. The coprocessor 110 may employ an instruction set, which may be a subset of the instruction set implemented by the processors 105. The processors 105 may recognize instructions implemented by the coprocessor 110 and may issue the instructions to the coprocessor 110 for execution. Any mechanism for transporting the coprocessor instructions from the processors 105 to the coprocessor 110 may be used. For example, FIG. 2 illustrates a communication path between the processors 105 and the coprocessor 110. The path (which may comprise multiple channels corresponding to multiple instances of a processor) may be a dedicated communication path, for example if the coprocessor 110 is physically located near the processors 105. The communication path may be shared with other communications, some of which may be carried out by other agents. For example, a packet-based communication system could be used to transmit memory requests to the system memory and instructions to the coprocessor 110. In one particular embodiment, coprocessor instructions may be communicated through the L2 cache 235 to the coprocessor 110. In an embodiment, instructions may be bundled and transmitted to the coprocessor 110. For example, cache operations, cache evictions, etc. may be transmitted by the processors 105 to the L2 cache 235, and thus there may be an interface to transmit an operation and a cache line of data. The same interface may be used, in an embodiment, to transmit a bundle of instructions to the coprocessor 110 through the L2 cache 235.

In one embodiment, the computation operations specified by the instructions implemented in the coprocessor 110 may be performed on vectors of input operands. For example, an embodiment receives vectors of operands from the X memory 137X and the Y memory 137Y. Operand data may be loaded into X memory 137X and/or Y memory 137Y from system memory 275 or from L2 cache 235.

The execution circuit 130 may include an array or grid of PEs 131 that implement circuitry to perform the operations to be carried out by coprocessor 110. Each PE 131 may receive one or more of the vector of elements from the X memory 137X and one or more of the vector of elements from the Y memory 137Y, and may evaluate the operation on the vector elements. In an embodiment, the result of the operation may be accumulated with the current value in a corresponding location in the Z memory 132. It is noted that in the embodiment shown, the Z memory 132 may be distributed among the various array or grid of processing elements, rather than being one physically contiguous memory. In an embodiment, the instructions executed by the coprocessor 110 may have a vector mode and a matrix mode. In the vector mode, each vector element of X is evaluated against a corresponding vector element of Y, producing a vector of results. In the matrix mode, an outer product of the input vector operands may be computed in one embodiment. In still another embodiment, various matrix operations may be supported using in the matrix mode, and each vector element of X may be operated upon with each vector element of Y in the matrix mode. In still another embodiment, the X memory 137X and the Y memory 137Y may store vectors of matrices (e.g., 2×2 matrices or any other size of matrices, stored in either column major or row major format). The array of processing elements may perform matrix operations on the matrices.

Based on the location of a given processing element in the array, there is a subset of the Z memory 132 that the processing element may update in response to coprocessor instructions. That is, each processing element produces a portion of the overall result of an instruction. The result produced over all of the processing elements (or a subset of the processing elements, if an instruction specifies fewer than all of the processing elements to perform an operation) is the result of the instruction, and the result is written to locations in the Z memory 132 that are dispersed over the address space of the Z memory 132 in a regular pattern that depends on the instruction and the operand size of the instruction. Up to all of the Z memory 132 may be updated in response to an instruction, but each processing element updates a restricted portion of the Z memory 132 (and that processing element may be the only processing element in the execution circuit 130 that may update the restricted portion). The instruction may specify a Z memory address for the result, and the address identifies the location(s) within the restricted portion that are updated.

Physically distributing the Z memory 132 may provide various benefits. For example, the wiring to connect the Z memory 132 to the processing elements in the execution circuit 130 may be relatively short and compact as compared to if the Z memory 132 were implemented separately. This may lead to savings in area consumed, as well as saving power in reading and writing the Z memory 132.

As noted above in reference to FIG. 1, portions of the Z memory 132 may be reserved for contexts (e.g., data generated by correspondingly executed instructions) associated with the various ones of the processors 105. For example, if there are four processors/cores coupled to coprocessor 110, the Z memory 132 (and thus, each distributed element thereof) may be subdivided into four portions, with each portion reserved for a context associated with a particular one of the processors/cores. However, using renaming logic 205, portions of Z memory 132 that are not in use by their particular processor 105 (and thus, their respective context is inactive) may be re-used for an active context. For example, if only one processor 105 has an active context at a given time, register rename logic 205 may allocate the space in Z memory 132 corresponding to at least one inactive context to the active context. As Z memory 132 comprises a set of result registers, the operation of assigning space in Z memory 132 from an inactive context an active context effectively results in the renaming of ones of the result registers.

The ability to assign register space from an inactive context to an active context may result in improved performance. In the absence of result register space enabled by register rename logic 205, results written to Z memory 132 by a coprocessor instruction may require a store operation to write those results to L2 cache 235 or system memory 275 before the next instruction associated with that context can begin execution. With the extra result register space enabled by register rename logic 205, the results written to one portion of Z memory 132 may be stored to L2 cache 235 or system memory 275 concurrent with the next instruction beginning execution. Accordingly, the latency of store operations to write back results from Z memory 132 to a lower portion of the memory hierarchy does not cause delay to the beginning execution of the next instructions when register renaming is utilized in accordance with this disclosure.

Rename logic 205 may track the usage of Z memory 132 and may thus track which ones of processors 105 have an active context and which ones have an inactive context at a given time. For example, when operations for a given processor 105 are complete in coprocessor 110, the rename logic 205 may identify an inactive context in response to detecting execution of an instruction indicating that a context has become inactive. This event may be a trigger to indicate to rename logic 205 that the context is no longer active and that corresponding space in Z memory 132 is available for register renaming. Embodiments are also possible and contemplated in which rename logic 205 may be coupled to an instruction decoder (not shown in FIG. 2) and may detect the presence of such instructions that, responsive to their decoding, indicate that a context becoming inactive is imminent.

The active and inactive contexts may be tracked by rename logic 205 using, e.g., a free list that lists those contexts that are currently inactive. When new instructions are provided by a corresponding one of processors 105, a context previously appearing on the free list as inactive may be removed from the list (or alternatively, marked as active to indicate that it is currently unavailable). When operations are completed for an active context, as indicated to rename logic 205 by one of the triggers discussed above, it may be returned to the free list as an inactive context.

The ability to rename registers may also eliminate a potential write after read hazard, where an instruction attempts to write to a portion of Z memory 132 before it has been read (e.g., by a store operation). Instead, the next instruction begins writing to a different (renamed) portion of Z memory 132, while the results from the previous instruction may be stored to a lower level memory in the memory hierarchy.

In an embodiment, the coprocessor 110 may support various data types and data sizes (or precisions). For example, floating point and integer data types may be supported. The floating point data type may include 16-bit, 32-bit, and 64-bit precisions. The integer data types may include 8 bit and 16 bit precisions, and both signed and unsigned integers may be supported. Other embodiments may include a subset of the above precisions, additional precisions, or a subset of the above precisions and additional precisions (e.g., larger or smaller precisions). In an embodiment, 8-bit and 16-bit precisions may be supported on input operands, and 32-bit accumulations may be supported for the results of operating on those operands.

In an embodiment, some coprocessor instructions (e.g., coprocessor load/store instructions) may specify load operations and/or store operations to move data between the system memory and the X memory 137X, Y memory 137Y, and Z memory 132. For example, load operations may transfer vectors between a system memory 375 and the X memory 137X, Y memory 137Y, and/or Z memory 132. Similarly, the load and/or store operations may transfer vectors between L2 cache 235 and X memory 137X, Y memory 137Y, and/or Z memory 132. In some embodiments, prefetch operations may be used to prefetch operand data into L2 cache 235, with the data subsequently loaded into X memory 137X and/or Y memory 137Y for use in the execution of a corresponding instruction. The coprocessor store operations may write the vectors from the X memory 137X and Y memory 137Y to system memory. The Z memory 132 may be written to memory using an extract instruction to move the results to the X memory 137X and/or the Y memory 137Y, and then storing the results from the X memory 137X and/or the Y memory 137Y to system memory. Alternatively, a store instruction to store the Z memory 132 to main memory may also be supported.

In an embodiment, the coprocessor 110 may be cache coherent with the processors 105. In an embodiment, the coprocessor 110 may have access to the L2 cache 235, and the L2 cache 235 may ensure cache coherency with the caches of processors 105 (e.g., L1 data caches). In yet another alternative, the coprocessor 110 may have access to the memory system, and a coherence point in the memory system may ensure the coherency of the accesses. In yet another alternative, the coprocessor 110 may have access to the caches within processors 105. In still another embodiment, the coprocessor 110 may have one or more caches (which may be virtually addressed or physically addressed, as desired). The coprocessor 110 may also have its own dedicated caches while also having the ability to access to the L2 cache 235 for misses in those caches. Any mechanism for accessing memory and ensuring coherency may be used in various embodiments.

The processors 105 may be responsible for fetching the instructions executed by the processors 105 and the coprocessor 110. In an embodiment, the coprocessor instructions may be issued by the processors 105 to the coprocessor 110 when they are no longer speculative. Generally, an instruction or operation may be non-speculative if it is known that the instruction is going to complete execution without exception/interrupt or flush due to incorrect speculation (e.g., branch misprediction). Thus, an instruction may be non-speculative once prior instructions (in program order) have been processed to the point that the prior instructions are known to not cause exceptions/speculative flushes in the processors 105 and the instruction itself is also known not to cause an exception/speculative flush. Some instructions may be known not to cause exceptions based on the instruction set architecture implemented by the processors 105 and may also not cause speculative flushes. Once the other prior instructions have been determined to be exception-free and flush-free, such instructions are also exception-free and flush-free.

The instruction buffer 220 may be provided to allow the coprocessor 110 to queue instructions while other instructions are being performed. In an embodiment, the instruction buffer 220 may be a first in, first out buffer (FIFO). That is, instructions may be processed in program order. Other embodiments may implement other types of buffers, multiple buffers for different types of instructions (e.g., load/store instructions versus compute instructions) and/or may permit out of order processing of instructions.

The X memory 137X and the Y memory 137Y may each be configured to store at least one vector of input operands. Similarly, the Z memory 132 may be configured to store at least one computation result generated from a vector of operands from the X memory 137X and a vector of operands from the Y memory 137Y. The result may be a matrix of results at the result size (e.g., 16 bit elements, 32 bit elements, or 64 bit elements). Alternatively, the result may be a vector, depending on the instruction. In some embodiments, the X memory 137X and the Y memory 137Y may be configured to store multiple vectors and/or the Z memory 132 may be configured to store multiple result matrices/vectors. Each vector/matrix may be stored in a different bank in the memories, and operands for a given instruction may be identified by bank number. More generally, each entry in the memories 137X, 137Y, and 132 may be addressed by a register address (e.g., register number) and thus the entries in the memories may be viewed as registers, similar to an integer or floating point register in the processors 105 (although generally significantly larger than such a register in terms of storage capacity). Viewed in another way, each of the memories 137X, 137Y, and 132 may be addressable as entries using addresses that are referenced to the particular memory (e.g., each memory 137X, 137Y, and 132 may have its own address space). A given address of a given entry in the X memory 137X, for example, may have the same numerical value as a second given address of a second given entry in the Y memory 137Y. Because they are coded in a given instruction as an X memory address or a Y memory address, the correct entry from the correct memory to be read/written may be selected by the coprocessor 110.

The execution circuit 130 may be configured to perform the computation operations, as previously mentioned. The memory access interface 250 may be configured to perform the coprocessor load/store operations. The coprocessor 110 may provide the coprocessor load/store operations from the instruction buffer 220 to the memory access interface 250, which may include a queue for the load/store operations and control logic to select the load/store operations for execution. The memory access interface 250 may further include a merge buffer to merge load operations and store operations, as mentioned previously and discussed in more detail below. The address of the coprocessor load/store operations may be provided with the operation from the processors 105. In one embodiment, the processors 105 may generate a virtual address from one or more address operands of the load/store operation, and may translate the virtual address to a physical address through a memory management unit (e.g., a translation lookaside buffer (TLB) and/or related hardware). In another embodiment, the coprocessor 110 may include a TLB and/or other MMU hardware, and the processors 105 may provide a virtual address which may be translated by the coprocessor 110. TLB management instructions executed by the processors 105 may also be transmitted to the coprocessor 110 in such embodiments, to manage the coprocessor 110 TLB coherently with the processors 105 TLB. However, for coprocessor store operations, the source data from one of the memories 137X, 137Y, and 132 may not be available until prior compute operations have been completed. Coprocessor load operations may generally be ready for execution when provided to the memory access interface 250, but may have ordering constraints with younger coprocessor load/store operations. The memory access interface 250 may be configured to resolve the ordering constraints and transmit the memory operations to the L2 cache 235.

In an embodiment, the L2 cache 235 may be configured to check for a cache hit for the coprocessor load/store operations, and may also determine if the data (or a portion thereof) accessed by the coprocessor load/store operations is in a data cache in the processors 105. The L2 cache 235 may be inclusive of the CPU processor data cache, and thus the tag for the cache line in the L2 cache 235 may indicate if the cache line is in the data cache. Alternatively, the L2 cache 235 may include a set of tags for the data cache and may track which cache blocks are in the data cache in the set of tags. If the data is in the data cache, the L2 cache 235 may generate an operation to invalidate the data cache line (and fetch the data if it is modified). This operation may be referred to as a "back snoop" operation. Additionally, the L2 cache 235 may detect a cache miss for a coprocessor load/store operation, and may fetch the missing cache line from another lower level cache or the main memory to complete the request.

A cache line may be the unit of allocation/deallocation in a cache. That is, the data within the cache line may be allocated/deallocated in the cache as a unit. Cache lines may vary in size (e.g., 32 bytes, 64 bytes, 128 bytes, or larger or smaller cache lines). Different caches may have different cache line sizes (e.g., the data cache in the Processors 105 may have a smaller cache line size than the L2 cache 235, in an embodiment). Each cache may have any desired capacity, cache line size, and configuration. The L2 cache 235 may be any level in the cache hierarchy (e.g., the last level cache (LLC) for the processors 105, or any intermediate cache level between the processors 105/coprocessor 110 and the main memory system). There may be more levels of cache between the CPU caches and the L2 cache 235, and/or there may be additional levels of cache between the L2 cache 235 and the main memory.

It is noted that the coprocessor 110 may be illustrated in simplified form, in an embodiment, and may include additional components not shown in FIG. 2. For example, the coprocessor 110 may include a pipeline to decode coprocessor operations, perform register renaming for X memory 137X and Y memory 137Y, use a physical memory size for the X memory 137X and Y memory 137Y that is larger than the architected size, and execute computation operations out of order. Any implementation of the coprocessor 110 may be used in various embodiments.

As noted elsewhere, coprocessor 110 may be shared by multiple processors 105. The coprocessor 110 may maintain separate contexts in the X memory 137X, Y memory 137Y, for each of processors 105, for example, similar to the manner in which portions of Z memory 132 may be reserved for contexts associated with different ones of the processors 105. Alternatively, contexts may be swapped in the coprocessor 110 when different processors 105 issue coprocessor operations to the coprocessor 110. Generally speaking, coprocessor 110 may play a subordinate role to the various instances of a processor 105, augmenting the operation of the latter by performing operations (e.g., the vector and or matrix operations discussed above) for which it is optimized.

Figure 3:
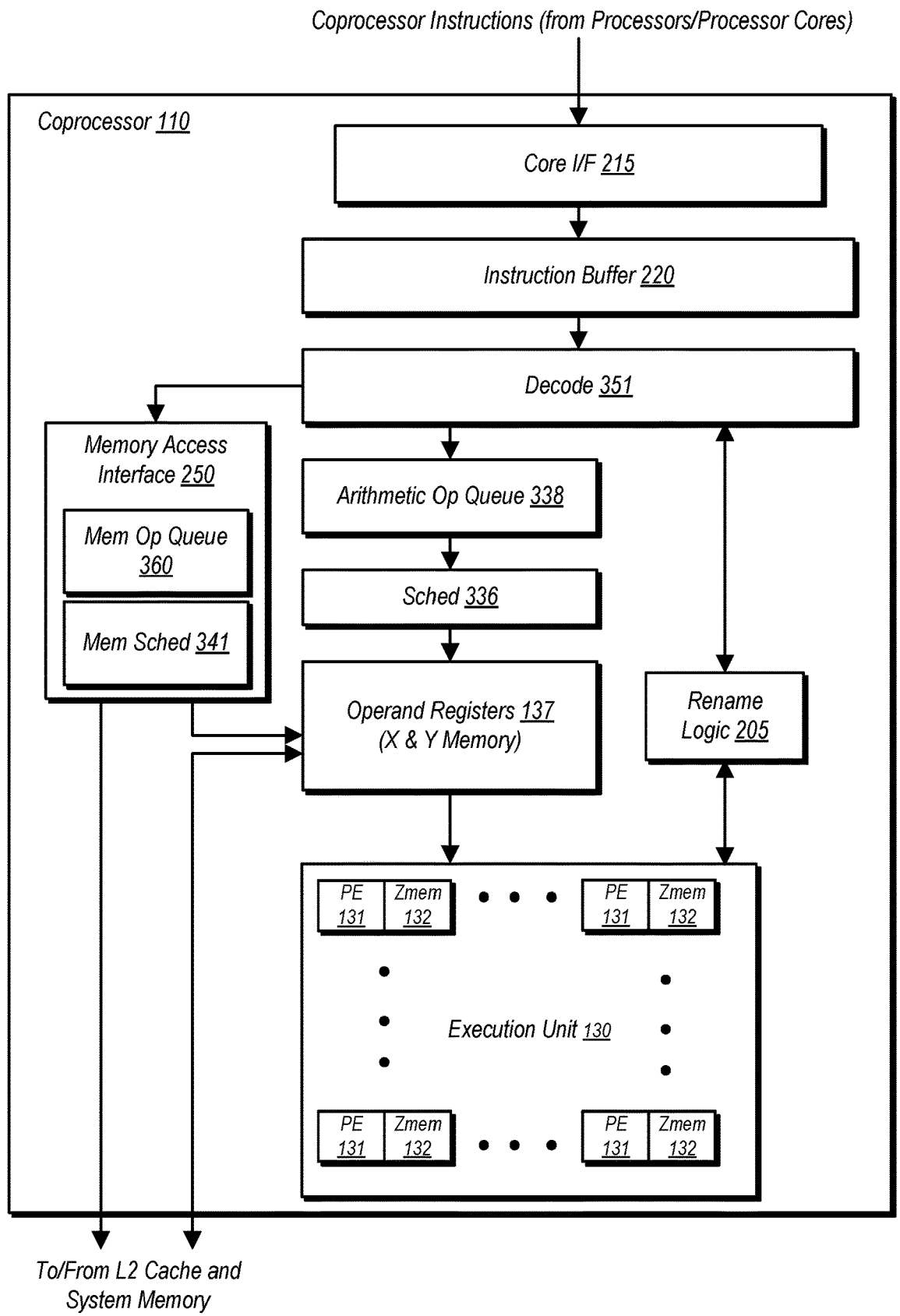
FIG. 3 is a block diagram of another embodiment of a coprocessor.

FIG. 3 is a block diagram of one embodiment of the coprocessor 110 in greater detail. In the illustrated embodiment, the coprocessor 110 includes a core interface 215, the instruction buffer 220, a decode unit 351, the memory access interface 250, an arithmetic operation (op) queue 338, operand registers 137 (which comprises X memory 137X and Y memory 137Y, as discussed above), execution circuit 130, and a scheduler circuit 336. The execution circuit 130 includes an array of processing elements (PEs) 131, arranged as a grid of rows and columns. Each of the PEs 131 is coupled to a respective portion of a Z memory 132. The instruction buffer 220 is coupled to receive instructions to be executed by the coprocessor 110, and is coupled to the decode unit 351. The decode unit 351 is coupled to the arithmetic op queue 338, which is further coupled to the operand registers 137. Operand registers 137 are coupled to the execution circuit 130. The operand registers 137 are also coupled to the memory access interface 250, and both the memory access interface 250 and the operand registers 137 are coupled to an L2 cache (not shown here). The memory access interface 250 includes a memory op queue 360 and a memory scheduler 341. Coprocessor 110 in the embodiment shown also includes rename logic 205, which is coupled to execution unit 130 (and thus, Z memory 132) and decode unit 351.

Generally, the coprocessor 110 may be configured to receive instructions in the instruction buffer 220 conveyed from a number of different processors 105. The decode unit 351 may decode the instructions into one or more operations (ops) for execution. The ops may include compute ops that are executed in the execution circuit 130, memory ops to read data from memory into the operand registers 137 and store data from the Z memory 132 to memory (e.g., via the L2 cache or directly to system memory), and other ops that may update a system state. Scheduler 336 may schedule decoded instructions for execution by various ones of the PEs 131.

In one embodiment, the operand registers 137 may be the source of operands for compute ops executed by the execution circuit 130, and results may be stored in the distributed Z memory 131 within the execution circuit 130. That is, the operand registers 137 may include the storage for the X memory 137X and the Y memory 137Y as shown in FIG. 2. The entries from the X memory 137X and the Y memory 137Y may be renamed by the decode unit 351 (or alternatively, by rename logic 205) to various entries in the operand registers 137 using register renaming techniques.

As mentioned previously, the coprocessor 110 may be designed to execute instructions which specify vectors of operands and a compute (arithmetic/logic unit (ALU)) operation to be performed on the operands. For example, various types of multiply/accumulate operations may be supported. The multiplications may be performed in parallel on the vectors of operands. Thus, the execution circuit 130 includes an array of processing elements (PEs) 131. The array of PEs 131 may include a horizontal direction (row) and a vertical direction (column), as illustrated in FIG. 3. Each PE 131 may receive an operand from one or more input vector elements for an op, and may perform the specified compute operation on the operands to produce a result. Some ops may specify a vector of results, and a subset of the PEs 131 may be used for such ops. Other ops may specify an array (or matrix) of results. For example, in an embodiment, the multiply-accumulate operations over the vectors of input operands may produce an outer product of the vectors. Other multiply-accumulate operations may be performed in matrix mode for such embodiments. Up to all of the PEs 131 may be used for matrix-mode ops. However, in some cases, even the array of results may not use all of the PEs 131. For example, in some cases, not all of the vector of input operands may be used.

In an embodiment, for matrix operations, the vector of operands from the Y memory 137Y may be provided as a "column" to the execution circuit 130 and the vector of operands from the X memory 137X may be provided as a "row" to the execution circuit 130. Thus, a given vector element from the X memory 137X may be supplied to a column of PEs 131, and a given vector element from the Y memory 137Y may be supplied to a row of PEs 131 for a matrix operation. Because different operand sizes are supported, the number of vector elements supplied to a given PE 131 depends on the operand size of the instruction. For example, if the execution circuit 130 has N PEs 131 in a row or column, each PE 131 may receive 1/Nth of the data from an entry. The number of operands in the data, and thus the number of operations performed by the PE 131 for a given instruction, may depend on the operand size of the instruction. In one embodiment, the largest operand size may be 1/Nth of the data from an entry (e.g. each PE 131 may operate on one operand at the largest operand size). The operand sizes vary by a power of 2, so each PE 131 may operate on two operands of the second largest operand size, four operands of the third largest operand size, etc.

An issued arithmetic op may read their source operands from the operand registers 137 and progress to the PEs 131 in the execution circuit 130 for execution. The PEs 131 may perform the specified operation, generating results and writing the results to the local Z memory locations 132 implemented at the PEs 131.

Similar to the scheduler circuit 336, the memory scheduler circuit 341 may wait for the source operands of the memory ops to be ready and issue the memory ops. The memory scheduler circuit 341 may ensure that memory ops to the same address are issued in program order (e.g. using dependency vectors or other mechanisms based on comparing the addresses accessed by the memory ops). The source operands may be store data for store memory ops. Load memory ops may not have specific source operands, since the memory addresses are provided by the processor 105 in this embodiment. However, load memory ops may still be scheduled based on address dependencies, if any. The store ops may read their source operands from the operand registers 137, which may transit the data to the L2 cache along with the memory op/address from the memory access interface 250. For load ops, the L2 cache may provide data to the operand registers 137 (and the address at which the data is to be written, which may be transmitted to the L2 cache by the memory access interface 250 when transmitting the load ops). The writing of the load op data to the operand registers 137 may also be communicated to decode unit 351, to indicate that source data in those memory locations is now available.

Figure 4:
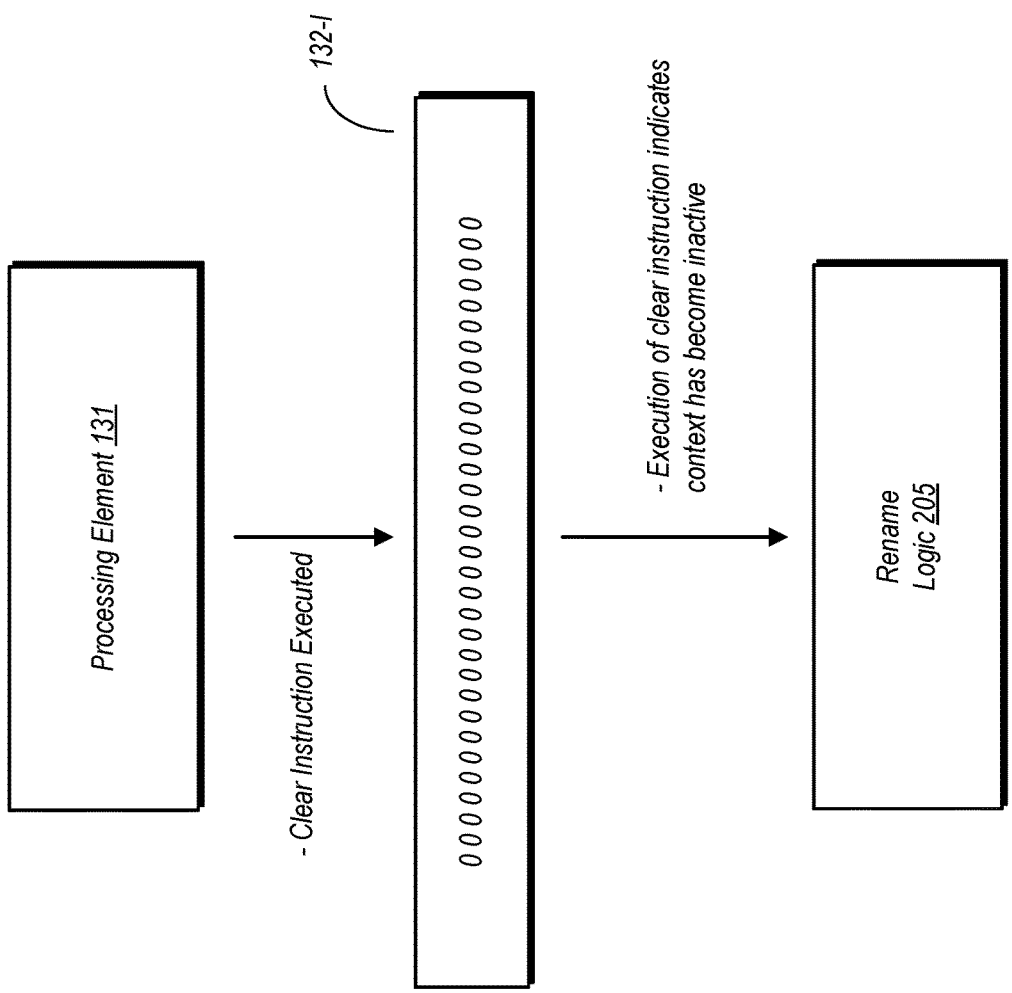
FIG. 4 is a diagram illustrating one embodiment of a mechanism for indicating the presence of an inactive context.

Certain Aspects of Register Renaming Operation:

FIG. 4 is a diagram illustrating one embodiment of a mechanism for indicating the presence of an inactive context. As shown in FIG. 4, a processing element 131 may execute a clear instruction. The clear instruction may be executed in response to a context becoming inactive due to completion of operations under which it had been used. Renaming may be triggered by execution of a zero instruction that may cause all logic zeros to be written to a particular one of Z memory 132-I as shown here. The portion of Z-memory 132-I shown here may represent an aggregate of all the distributed storage elements reserved for a particular context. The execution of the clear instruction may occur when a context completes its current operations and transitions into an inactive state. Accordingly, when the rename logic 205 in the embodiment shown detects the execution of the clear instruction, it may determine that the corresponding context is now inactive. Rename logic 205 may, for example, update a free list internal thereto that lists the contexts that are currently inactive in coprocessor 110.

It is noted that in some embodiments, rename logic 205 may detect the presence of a clear instruction in a decode unit, such as that discussed above in reference to FIG. 3. Detecting the presence of the decoded clear instruction may thus provide an indication that the context is about to become inactive. In some embodiments, rename logic 205 may mark (e.g., on the free list) the context as pending inactive and may subsequently remove the pending status when the clear instruction is executed.

Figure 5:
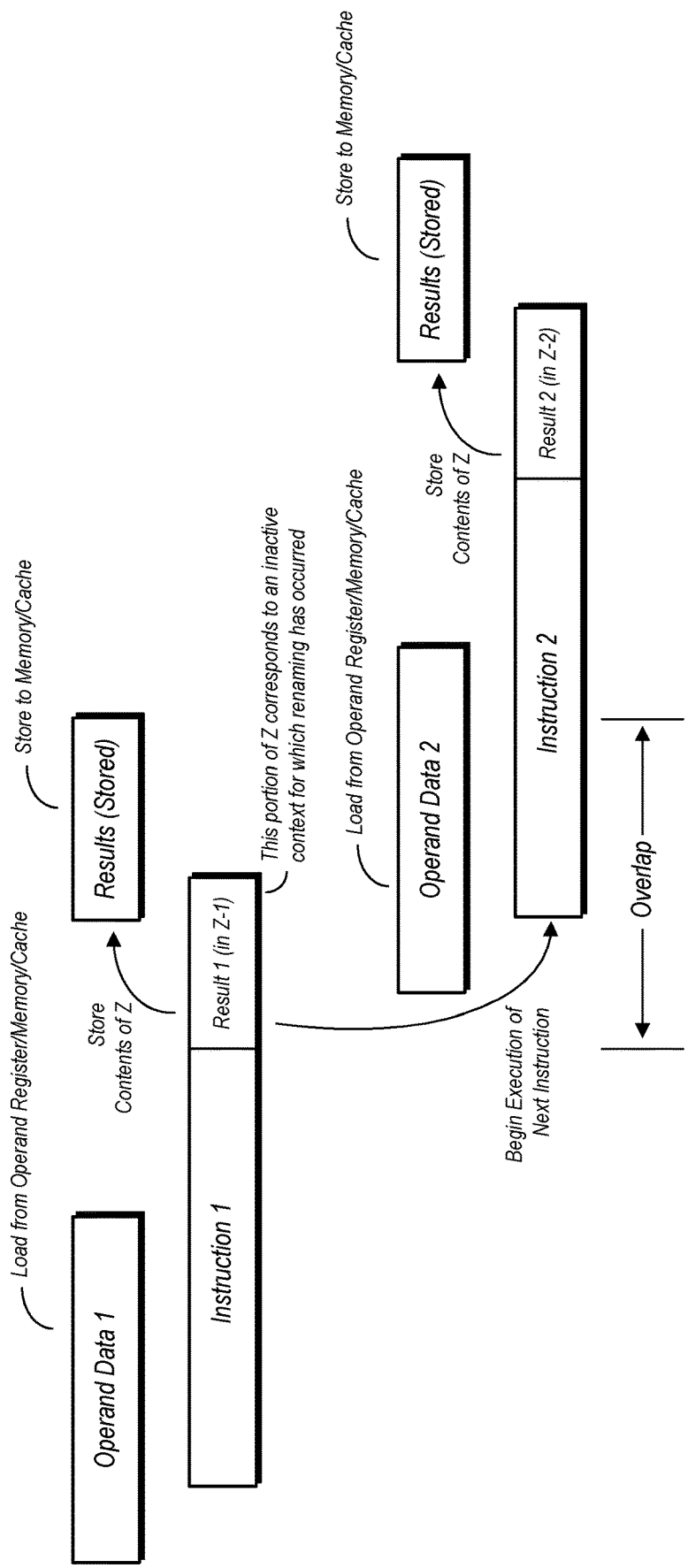
FIG. 5 is a diagram illustrating pipeline operations in a coprocessor with result register renaming.

FIG. 5 is a diagram illustrating pipeline operations in a coprocessor with result register renaming. In the example shown, a first set of operand data, Operand Data 1, is provide for use for the execution of Instruction 1. As Instruction 1 is executed, the results are stored in a portion of Z memory 132. In this particular example, the portion of Z memory 132, Z-1, into which the results of Instruction 1 are written, corresponds to an inactive context for which renaming has occurred in order to allow it to be used by an active context. After instruction execution completes, a store operation commences, with the results from Z-1 being written back to a cache memory and/or main system memory.

Upon completion of the execution of Instruction 1, Operand Data 2 is provided for the execution of Instruction 2. This may occur concurrent with the store operation of the results in Z-1. Accordingly, as shown, the beginning of providing Operand Data 2 and the beginning of execution of Instruction 2 are not delayed by waiting until the completion of the store operation of the results from Z-1. The overlap portion shown in FIG. 5 may represent an example of an amount of latency that is avoided by performing of the rename operations as disclosed herein. The amount of latency that can be eliminated by using register renaming as disclosed herein can be significant due to the distributed nature of the result register/Z memory, the number of processing elements in the coprocessor, the amount of register space reserved for each context, and the number of processors served by the coprocessor. As noted elsewhere, the register size in this type of coprocessor can be, in one embodiment, on the order of several tens of kilobytes in size, which is significantly larger than typical registers in, e.g., superscalar processors. Thus, the delay in beginning execution of the next instruction, in the absence of the register renaming disclosed herein, may at least be as large as the time required to fully write the contents of the result register back to memory and/or cache memory.

Furthermore, in accordance with the discussion above, the use of a different portion of the result registers (Z-2 in this case) to store the results of Instruction 2 may avoid a write after read hazard that could otherwise occur if Instruction 2 begins execution before the completion of the store operation from Z-1.

Figure 6:
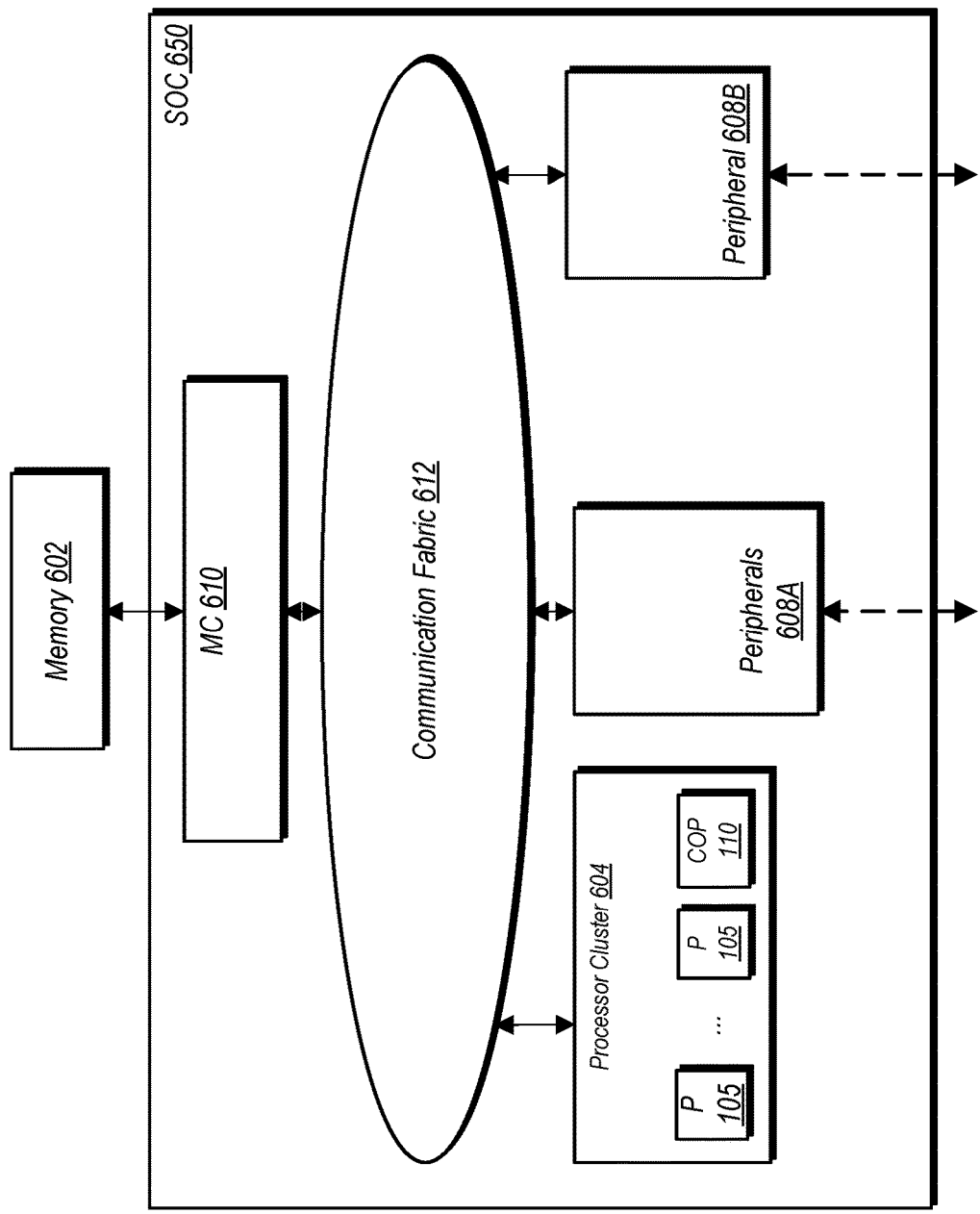
FIG. 6 is a block diagram of one embodiment of a system-on-a-chip.

System-On-a-Chip (SoC) Embodiment:

FIG. 6 is a block diagram of one embodiment of a system that includes a system on a chip (SoC) 650 coupled to a memory 602. As implied by the name, the components of the SoC 650 may be integrated onto a single semiconductor substrate as an integrated circuit "chip." In the illustrated embodiment, the components of the SoC 650 include at least one processor cluster 604, one or more peripheral components such as peripheral components 608A-608B (more briefly, "peripherals"), a memory controller 610, and a communication fabric 612. The components 605, 608A-608B, and 610 may all be coupled to the communication fabric 612. The memory controller 610 may be coupled to the memory 602 during use. In some embodiments, there may be more than one memory controller coupled to a corresponding memory. The memory address space may be mapped across the memory controllers in any desired fashion in such embodiments. In the illustrated embodiment, the processor cluster 604 may include a plurality of processors (P) 12. The processors 105 may form the central processing units (CPU(s)) of the SoC 650. The processor cluster 604 may further include one or more coprocessors (e.g., the coprocessor 110 as discussed elsewhere herein) that may be optimized for a subset of the processor instruction set and may be used by the processors 105 to execute instructions in the subset. For example, the coprocessor 110 may be a matrix engine optimized to perform vector and matrix operations, as discussed above.

As mentioned above, the processor cluster 604 may include one or more processors 105 that may serve as the CPU of the SoC 650. The CPU of the system includes the processor(s) that execute the main control software of the system, such as an operating system. Generally, software executed by the CPU during use may control the other components of the system to realize the desired functionality of the system. The processors may also execute other software, such as application programs. The application programs may provide user functionality, and may rely on the operating system for lower-level device control, scheduling, memory management, etc. Accordingly, the processors may also be referred to as application processors.

Generally, a processor may include any circuitry and/or microcode configured to execute instructions defined in an instruction set architecture implemented by the processor. Processors may encompass processor cores implemented on an integrated circuit with other components as a system on a chip (SoC 650) or other levels of integration. Processors may further encompass discrete microprocessors, processor cores and/or microprocessors integrated into multichip module implementations, processors implemented as multiple integrated circuits, etc.

The memory controller 610 may generally include the circuitry for receiving memory operations from the other components of the SoC 650 and for accessing the memory 602 to complete the memory operations. The memory controller 610 may be configured to access any type of memory 602. For example, the memory 602 may be static random-access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g., LPDDR, mDDR, etc.). The memory controller 610 may include queues for memory operations, for ordering (and potentially reordering) the operations and presenting the operations to the memory 602. The memory controller 610 may further include data buffers to store write data awaiting write to memory and read data awaiting return to the source of the memory operation. In some embodiments, the memory controller 610 may include a memory cache to store recently accessed memory data. In SoC implementations, for example, the memory cache may reduce power consumption in the SoC by avoiding reaccess of data from the memory 602 if it is expected to be accessed again soon. In some cases, the memory cache may also be referred to as a system cache, as opposed to private caches such as the L2 cache or caches in the processors, which serve only certain components. Additionally, in some embodiments, a system cache need not be located within the memory controller 610.

The peripherals 608A-608B may be any set of additional hardware functionality included in the SoC 650. For example, the peripherals 608A-608B may include video peripherals such as one or more graphics processing units (GPUs), an image signal processor configured to process image capture data from a camera or other image sensor, video encoder/decoders, scalers, rotators, blenders, display controller, etc. The peripherals may include audio peripherals such as microphones, speakers, interfaces to microphones and speakers, audio processors, digital signal processors, mixers, etc. The peripherals may include interface controllers for various interfaces external to the SoC 650 including interfaces such as Universal Serial Bus (USB), peripheral component interconnect (PCI) including PCI Express (PCIe), serial and parallel ports, etc. The interconnection to external device is illustrated by the dashed arrow in FIG. 6 that extends external to the SoC 650. The peripherals may include networking peripherals such as media access controllers (MACs). Any set of hardware may be included.

The communication fabric 612 may be any communication interconnect and protocol for communicating among the components of the SoC 650. The communication fabric 612 may be bus-based, including shared bus configurations, cross bar configurations, and hierarchical buses with bridges. The communication fabric 612 may also be packet-based, and may be hierarchical with bridges, cross bar, point-to-point, or other interconnects.

It is noted that the number of components of the SoC 650 (and the number of subcomponents for those shown in FIG. 6, such as the processors 12 in each processor cluster 604 may vary from embodiment to embodiment. Additionally, the number of processors 105 in one processor cluster 604 may differ from the number of processors 105 in another processor cluster 604 when multiple processor clusters are included. There may be more or fewer of each component/subcomponent than the number shown in FIG. 6.

Although not explicitly shown in FIG. 6, SoC 650 may include one or more lower level cache memories that may be shared by the various processors 105 and coprocessor 110 of processor cluster 604.

Figure 7:
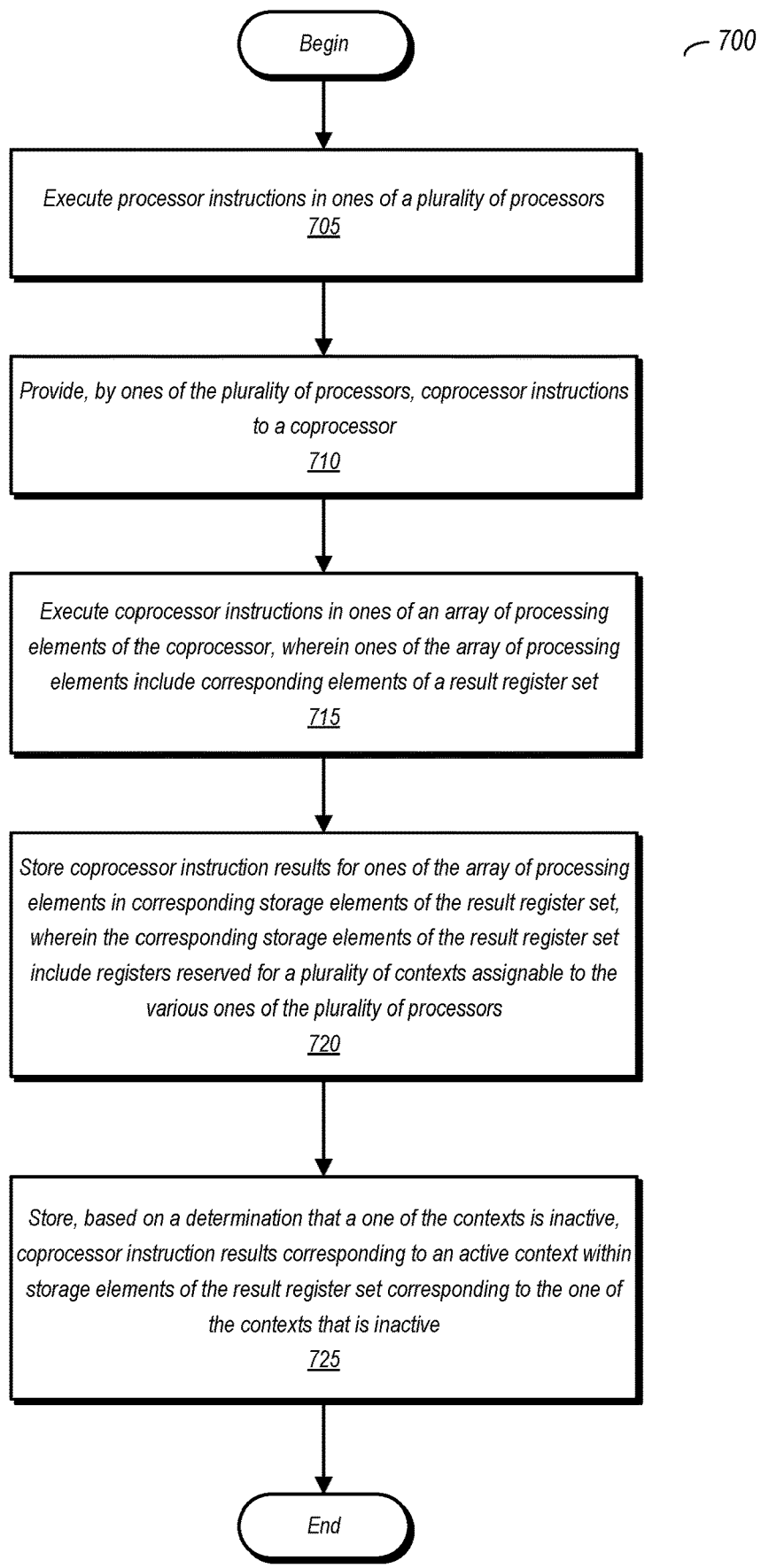
FIG. 7 is a flow diagram illustrating one embodiment of a method for performing result register renaming in a coprocessor.

Method for Operating a Coprocessor with Register Renaming:

FIG. 7 is a flow diagram illustrating one embodiment of a method for performing result register renaming in a coprocessor. Method 700 in the embodiment shown may be carried out by various ones of the embodiments of a coprocessor as discussed above. It is further noted that hardware embodiments of a coprocessor not explicitly discussed herein but nevertheless capable of carrying out Method 700 are considered to fall within the scope of this disclosure.

Method 700 includes executing processor instructions in ones of a plurality of processors (block 705) and providing, by ones of the plurality of processors, coprocessor instructions to a coprocessor (block 710). The method further includes executing coprocessor instructions in ones of an array of processing elements of the coprocessor, wherein ones of the array of processing elements include corresponding elements of a result register set (block 715). The execution of the instructions results in storing coprocessor instruction results for ones of the array of processing elements in corresponding storage elements of the result register set, wherein the corresponding storage elements of the result register set include registers reserved for a plurality of contexts assignable to the various ones of the plurality of processors (block 720). Thereafter, the method further includes storing, based on a determination that a one of the contexts is inactive, coprocessor instruction results corresponding to an active context within storage elements of the result register set corresponding to the one of the contexts that is inactive (block 725).

In some embodiments, the method includes determining, using rename logic, which of the plurality of contexts, if any, is inactive, and further includes assigning a corresponding result register of the inactive context to the active context. One aspect of operation in such embodiments includes identifying the one of the plurality of contexts as the inactive context in response to detecting execution of an instruction, wherein execution of the zeroing instruction causes all logic zeros to be written to a particular result register of the result register set corresponding to the inactive context. Another aspect implemented in some embodiments includes tracking, using the rename logic, which portions of a particular register of the result register set were used during execution of a particular instruction and identifying, using the rename logic, the inactive context in response to detecting that the portions of the particular register of the result register set have been written as all logic zeros. Some embodiments may also include rename logic renaming a particular one of the result register set in response to execution of a coprocessor instruction that writes to the particular one of the result register set but does not read from contents from the particular one of the register result set.

As previously noted, the coprocessor may include, in various embodiments, an array of processing elements arranged in rows and columns. Such embodiments may carry out portions of the method including executing vector instructions using ones of the array of processing elements. Similarly, these embodiments may carry out portions of the method that include executing matrix instructions using ones of the array of processing elements.

Figure 8:
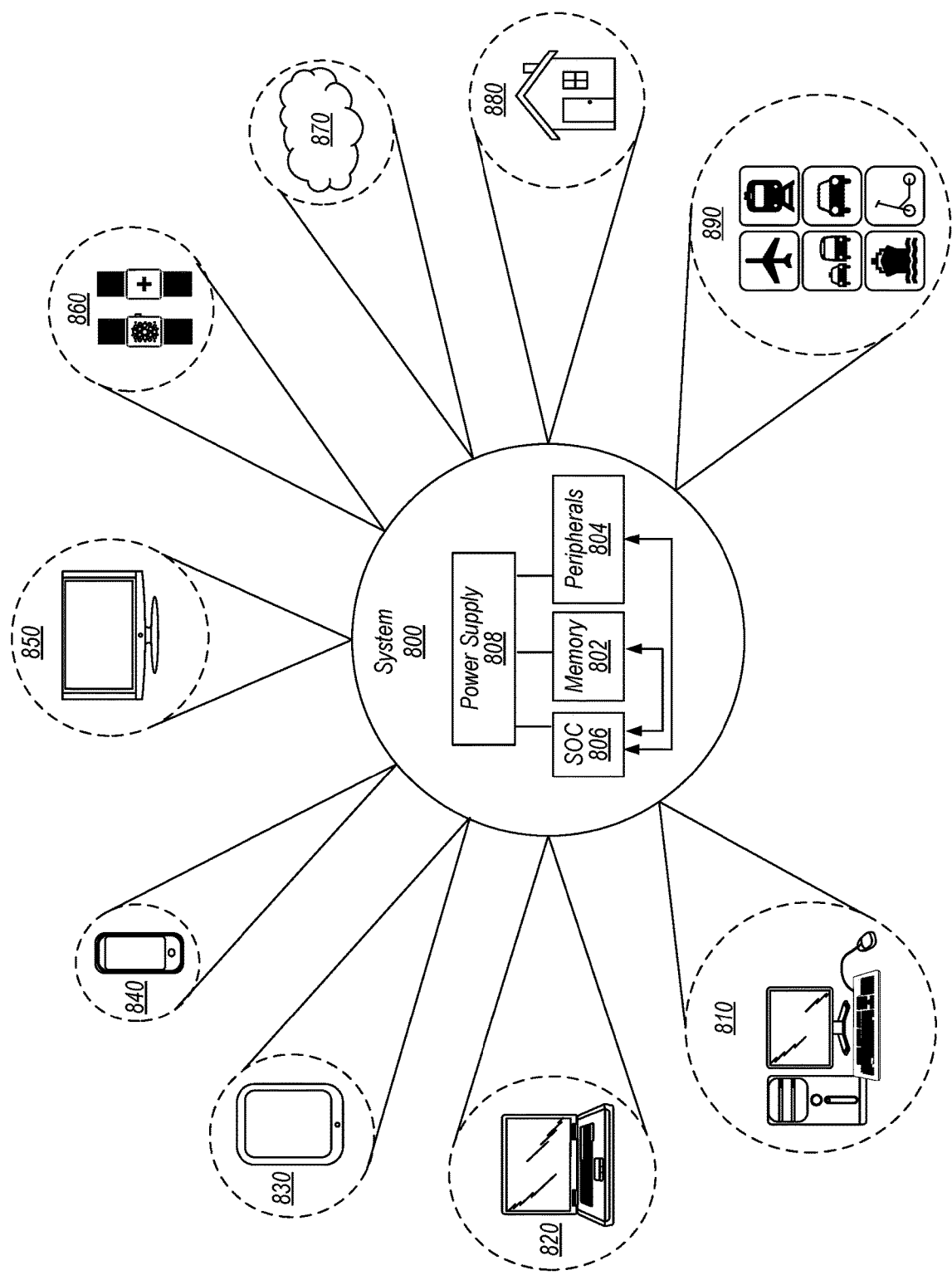
FIG. 8 is a block diagram of one embodiment of an example system.

Example System:

Turning next to FIG. 8, a block diagram of one embodiment of a system 800 is shown that may incorporate and/or otherwise utilize the methods and mechanisms described herein. In the illustrated embodiment, the system 800 includes at least one instance of a system on chip (SoC) 806 which may include multiple types of processing units, such as a central processing unit (CPU), a graphics processing unit (GPU), or otherwise, a communication fabric, and interfaces to memories and input/output devices. In some embodiments, one or more processors in SoC 806 includes multiple execution lanes and an instruction issue queue. In various embodiments, SoC 806 is coupled to external memory 802, peripherals 804, and power supply 808.

A power supply 808 is also provided which supplies the supply voltages to SoC 806 as well as one or more supply voltages to the memory 802 and/or the peripherals 804. In various embodiments, power supply 808 represents a battery (e.g., a rechargeable battery in a smart phone, laptop or tablet computer, or other device). In some embodiments, more than one instance of SoC 806 is included (and more than one external memory 802 is included as well).

The memory 802 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

SoC 806 in the embodiment shown may include multiple processors or processor cores and a coprocessor, in accordance with the various embodiments discussed above. The processors/cores may be general purpose processors configured to execute instructions of an instruction set architecture. The coprocessor may play a subordinate role to the processors/cores, and may be optimized to execute particular instructions that are not otherwise executed by the processors/cores. For example, a coprocessor may be optimized to execute matrix instructions. In various embodiments, the coprocessor may include an array of processing elements arranged in rows and columns, with each processing element being associated with a corresponding portion of a set of result registers. The various ones of the result registers may each be assigned to one of a number of contexts, with the various contexts corresponding to a particular one of the number of different processors/cores present in SoC 806. However, while particular contexts (and thus, particular portions of the result registers) may be reserved for a corresponding processor/core, a coprocessor implemented in SoC 806 may nevertheless have the capability of performing register renaming in accordance with the discussion above. More particularly, a portion of a result register that is not in use due to an inactive context (e.g., its corresponding processor/core has no current work for the coprocessor) may be re-assigned to allow use by a currently active context. Accordingly, results from the execution of instructions from an active context may be written into the register space associated with the portion that was re-assigned thereto, per the discussion above.

The peripherals 804 include any desired circuitry, depending on the type of system 800. For example, in one embodiment, peripherals 804 includes devices for various types of wireless communication, such as Wi-Fi, Bluetooth, cellular, global positioning system, etc. In some embodiments, the peripherals 804 also include additional storage, including RAM storage, solid state storage, or disk storage. The peripherals 804 include user interface devices such as a display screen, including touch display screens or multi-touch display screens, keyboard or other input devices, microphones, speakers, etc.

As illustrated, system 800 is shown to have application in a wide range of areas. For example, system 800 may be utilized as part of the chips, circuitry, components, etc., of a desktop computer 810, laptop computer 820, tablet computer 830, cellular or mobile phone 840, or television 850 (or set-top box coupled to a television). Also illustrated is a smartwatch and health monitoring device 860. In some embodiments, smartwatch 860 may include a variety of general-purpose computing related functions. For example, smartwatch 860 may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 800 may further be used as part of a cloud-based service(s) 870. For example, the previously mentioned devices, and/or other devices, may access computing resources in the cloud (i.e., remotely located hardware and/or software resources). Still further, system 800 may be utilized in one or more devices of a home other than those previously mentioned. For example, appliances within the home may monitor and detect conditions that warrant attention. For example, various devices 880 within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses by various conditions by the homeowner. Also illustrated in FIG. 8 is the application of system 800 to various modes of transportation 890. For example, system 800 may be used in the control and/or entertainment systems of aircraft, trains, buses, cars for hire, private automobiles, waterborne vessels from private boats to cruise liners, scooters (for rent or owned), and so on. In various cases, system 800 may be used to provide automated guidance (e.g., self-driving vehicles), general systems control, and otherwise. These any many other embodiments are possible and are contemplated. It is noted that the devices and applications illustrated in FIG. 8 are illustrative only and are not intended to be limiting. Other devices are possible and are contemplated.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure Le something physical). More specifically, this formulation is used to indicate that this structure is arranged to perform the one or more tasks during operation. A structure can be said to be "configured to" perform some tasks even if the structure is not currently being operated. Thus, an entity, described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus comprising:
a plurality of processors configured to execute processor instructions; and
a coprocessor configured to decode and execute coprocessor instructions, wherein ones of the plurality of processors are configured to provide the coprocessor instructions to the coprocessor, and wherein the coprocessor includes:
an operand register set configured to store operands for coprocessor instructions to be executed;
an array of processing elements;
a result register set comprising storage elements respectively distributed within the array of processing elements, wherein for a given member of the array of processing elements, a corresponding storage element is configured to store coprocessor instruction results generated by the given member; and
rename logic circuitry configured to monitor active contexts corresponding to the plurality of processors;
wherein the result register set implements a plurality of contexts configured to store respective coprocessor states corresponding to coprocessor instructions received from different ones of the plurality of processors;
wherein the rename logic circuitry is further configured to track which portions of a particular register of the result register set were used during execution of a particular instruction, and to identify an inactive context in response to detecting that at least a portion of the particular register of the result register set has been written as logic zeros; and
wherein, based on a determination that a one of the plurality of contexts is inactive, the coprocessor is configured to store coprocessor instruction results corresponding to an active context within storage elements of the result register set corresponding to the one of the plurality of contexts that is inactive.

2. The apparatus of claim 1, wherein the rename logic circuitry is further configured to:
determine which of the plurality of contexts, if any, is inactive; and
assign storage elements of the result register set corresponding to a particular inactive context to a particular active context.

3. The apparatus of claim 1, wherein the rename logic circuitry is configured to identify an inactive context in response to detecting execution of a zeroing instruction, wherein execution of the zeroing instruction causes all logic zeros to be written to a particular result register of the result register set, wherein the particular result register corresponds to a context that has become inactive.

4. The apparatus of claim 1, wherein the rename logic circuitry is configured to rename a particular one of the result register set in response to execution of an instruction that writes to the particular one of the result register set but does not read contents from the particular one of the result register set.

5. The apparatus of claim 1, wherein the coprocessor is configured to store coprocessor instruction results corresponding to an active context within storage elements of the result register set corresponding to the one of the plurality of contexts that is inactive in order to eliminate a write after read hazard.

6. The apparatus of claim 1, wherein the array of processing elements comprises N rows and N columns of processing elements, wherein N is an integer value.

7. The apparatus of claim 1, wherein the coprocessor is configured to execute vector instructions using ones of the array of processing elements.

8. The apparatus of claim 1, wherein the coprocessor is configured to execute matrix instructions using ones of the array of processing elements.

9. The apparatus of claim 1, wherein the operand register set includes a first operand register configured to store a first vector and a second operand register configured to store a second vector.

10. A method comprising:
executing processor instructions in ones of a plurality of processors;
providing, by ones of the plurality of processors, coprocessor instructions to a coprocessor;
executing coprocessor instructions in ones of an array of processing elements of the coprocessor, wherein ones of the array of processing elements include corresponding elements of a result register set;

storing coprocessor instruction results for ones of the array of processing elements in corresponding storage elements of the result register set, wherein the corresponding storage elements of the result register set include registers reserved for a plurality of contexts assignable to various ones of the plurality of processors;

tracking, using rename logic circuitry, which portions of a particular register of the result register set were used during execution of a particular instruction;

identifying, using the rename logic circuitry, an inactive context in response to detecting that the portions of the particular register of the result register set have been written as logic zeros; and storing, based on the identifying the inactive context, coprocessor instruction results corresponding to an active context within storage elements of the result register set corresponding to the inactive context.

11. The method of claim 10, further comprising:
assigning, using the rename logic circuitry, a corresponding result register of the inactive context to the active context.

12. The method of claim 11, further comprising:
identifying the inactive context in response to detecting execution of a clear instruction.

13. The method of claim 10, further comprising the rename logic circuitry renaming a particular one of the result register set in response to execution of a coprocessor instruction that writes to the particular one of the result register set but does not read contents from the particular one of the result register set.

14. The method of claim 10, further comprising:
executing vector instructions using ones of the array of processing elements; and
executing matrix instructions using ones of the array of processing elements.

15. The method of claim 10, further comprising:
storing a first vector in a first operand register;
storing a second vector in a second operand register; and
using the first and second vectors during execution of at least one coprocessor instruction.

16. A system comprising:
a plurality of processor cores configured to execute processor instructions; and
a coprocessor configured to receive coprocessor instructions from ones of the plurality of processor cores, wherein the coprocessor is configured to execute coprocessor instructions using ones of a plurality of processing elements arranged in an array, wherein the coprocessor further includes:

a plurality of result registers configured to store results of instructions executed by ones of the plurality of processing elements, wherein ones of the plurality of result registers are associated with ones of the plurality of processing elements, wherein the plurality of result registers implement a plurality of contexts, wherein ones of the plurality of contexts store respective coprocessor states corresponding to ones of the plurality of processor cores; and register renaming logic circuitry configured to determine that a particular one of the plurality of contexts is inactive in response to an instruction that causes a portion of a given one of the plurality of result registers to be written as all logic zeros;

wherein, based on a determination that the particular one of the plurality of contexts is inactive, the coprocessor is configured to store results generated from execution of coprocessor instructions corresponding to an active context in ones of the plurality of result registers corresponding to the particular one of the plurality of contexts that is inactive.

17. The system of claim 16, wherein the register renaming logic circuitry is further configured to determine which of the plurality of contexts is inactive and to designate corresponding ones of the plurality of result registers to be used by an active context.

18. The system of claim 16, wherein the register renaming logic circuitry is configured to determine that the particular one of the plurality of contexts is inactive in response to an instruction writing all logic zeros to a one of the plurality of result registers corresponding to the particular one of the plurality of contexts.

19. The system of claim 16, wherein the coprocessor is configured to:
execute vector instructions using ones of the plurality of processing elements; and
execute matrix instructions using ones of the plurality of processing elements.

20. The system of claim 16, further comprising:
a first operand register configured to store a first vector; and
a second operand register configured to store a second vector;
wherein the coprocessor is configured to use the first and second vectors during execution of at least one coprocessor instruction.

* * * * *